Figure 1:
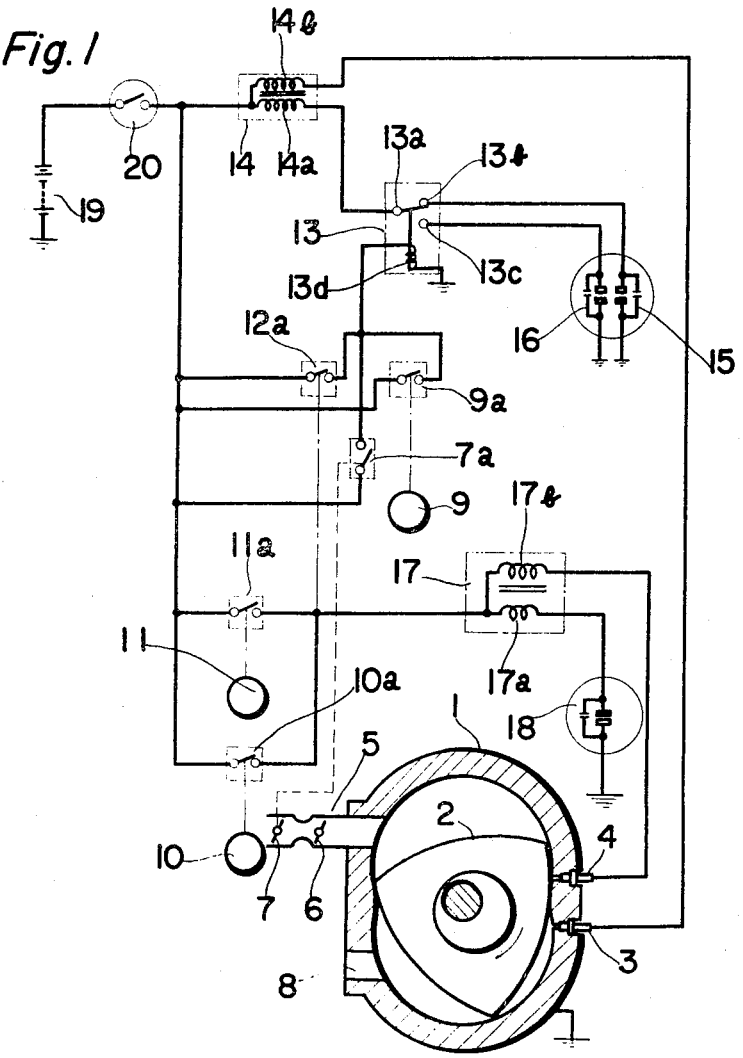

United States Patent [19]
Tatsutomi et al.

[11] 3,752,128
[45] Aug. 14, 1973

[54] SPARK PLUG IGNITION SYSTEM FOR USE IN ROTARY PISTON ENGINE

[75] Inventors: Yasuo Tatsutomi; Hitoshi Nakamura, both of Hiroshima-shi, Japan

[73] Assignee: Toyo Kogyo Co., Ltd., Hiroshima-ken, Japan

[22] Filed: Dec. 29, 1971

[21] Appl. No.: 213,519

[30] Foreign Application Priority Data
Dec. 29, 1970 Japan.............................. 45/135552

[52] U.S. Cl......... 123/8.09, 123/117 A, 123/148 C, 123/148 DS
[51] Int. Cl............................................ F02b 53/12
[58] Field of Search...................... 123/8.09, 148 C, 123/148 DS, 117 A

[56] References Cited
UNITED STATES PATENTS
| | | |
|---|---|---|
| 3,301,242 | 1/1967 | Candelise...................... 123/117 A |
| 3,534,717 | 10/1970 | Froede............................ 123/148 C |
| 3,584,608 | 6/1971 | Shibagaki............................ 123/8.09 |
| 3,626,909 | 12/1971 | Hayashida...................... 123/148 DS |
| 3,685,295 | 8/1972 | Tatsutomi...................... 123/148 DS |
| 3,687,120 | 8/1972 | Lenz................................ 123/117 A |

*Primary Examiner*—Clarence R. Gordon
*Attorney*—Craig, Antonelli and Hill

[57] ABSTRACT

A spark plug ignition system for use in a rotary piston internal combustion engine which essentially comprises a leading spark plug ignition circuit for controlling the ignition timing of the leading spark plug and a trailing spark plug ignition circuit for controlling the ignition of the trailing spark plug. In this arrangement, the provision has been made to retard the ignition timing of the leading spark plug in response to the engine operating condition while the trailing spark plug is switched off, for the purpose of substantially eliminating the emission of noxious unburned compounds present in the exhaust gas emerging from the exhaust system of the engine.

4 Claims, 2 Drawing Figures

SPARK PLUG IGNITION SYSTEM FOR USE IN ROTARY PISTON ENGINE

The present invention relates to a spark plug ignition system for use in a rotary piston internal combustion engine having a plurality of spark plugs arranged in the engine housing one behind the other in the direction of rotation of the piston or rotor.

More particularly, the present invention pertains to the spark plug ignition system of this kind by which the ignition timings of the spark plugs can be synchronized and differentiated in response to the engine speed, the engine temperature, the positioning of the choke valve and/or the positioning of the throttle valve for the purpose of reducing or substantially eliminating the emission of noxious unburned compounds present in the exhaust gas to the atmosphere.

As is well known to those skilled in the art, the typical model of rotary piston internal combustion engine comprises a housing structure having axially spaced end walls and a peripheral wall interconnecting the end walls to form a cavity therebetween, and a shaped multi-sided rotary piston or rotor rotatably mounted in said cavity and coaxially journalled with and on an eccentric portion of a power output shaft which extends axially through the center of the cavity and coaxially journalled in the end walls of the housing to produce planetary motion of the rotor during rotation of the shaft. The peripheral wall has an epitrochoidal-shaped inner surface and has at least two circumferentially spaced lobes. In this engine of the above construction, each cycle of the four strokes of intake, compression, power and exhaust is performed simultaneously around the rotor when the engine is running. At this time, each of a plurality of working chambers respectively defined between arcuate flanks of the shaped rotor and the epitrochoidal-shaped inner surface of the peripheral wall within the cavity is successively conditioned in the intake, compression, power and exhaust strokes and varies in volume as the shaped rotor undergoes the planetary motion.

In the conventional spark plug ignition system of this kind, at least a pair of spark plugs are located in the peripheral wall of the housing structure and arranged one behind the other in the direction of rotation of the rotor so that the spark plugs at the leading and trailing sides with respect to the rotor rotational direction are switched on and off in response to the engine temperature. In other words, the conventional system is designed such that, when the engine temperature is relatively lower, the spark plug at the leading side with respect to the rotor rotational direction can be switched on while the other spark plug at the trailing saide with respect to the rotor rotational direction can be switched off, thereby to retard a burning of the mixture supplied to one of the working chambers which has entered in the power stroke.

However, the conventional spark plug ignition system of this kind has a disadvantage in that, if the choke valve is closed during a period beginning from the engine start until the engine is warmed up to a suitable temperature, the combustible mixture passing through the intake system of the engine has a tendency to become enriched which badly affects the combustion thereof within the working chamber under power stroke in such a way as to emit a considerable amount of noxious unburned compounds such as carbon oxide and hydrogen carbon present in the exhaust gas.

Accordingly, an essential object of the present invention is to provide a spark plug ignition system for use in a rotary piston internal combustion engine of the type designed to reduce or substantially eliminate the emission of noxious unburned compounds contained in the exhaust gas emerging from the exhaust system of the engine, without any reduction of the combustion efficiency.

Another object of the present invention is to provide a spark plug ignition system for use in a rotary piston internal combustion engine of the type which can be operated by the cooperation of various switching devices operable in response to the engine speed, the engine temperature, the positioning of the choke valve and/or the positioning of the throttle valve for the purpose of achieving the above-mentioned object.

A further object of the present invention is to provide a spark plug ignition system for use in a rotary piston internal combustion engine of the type which can be easily employed in connection with the spark plug ignition system of this kind heretofore largely employed without substantial increase of the manufacturing cost.

According to the present invention, the spark plug ignition system of the above type, combustion of the fuel-air mixture within the working chamber under power stroke of the rotary piston internal combustion engine can be efficiently performed with respect to the rotation of the piston, thereby permitting the substantial elimination of the emission of the noxious unburned compounds. This is because the spark plug ignition system is designed such as to operate in response to one or more of a plurality of combinations of the engine speed, the engine temperature which is preferably represented by the temperature of the exhaust gas, the positioning of the choke valve and/or the positioning of the throttle valve for the purpose of achieving the above-mentioned objects.

Figure 2:
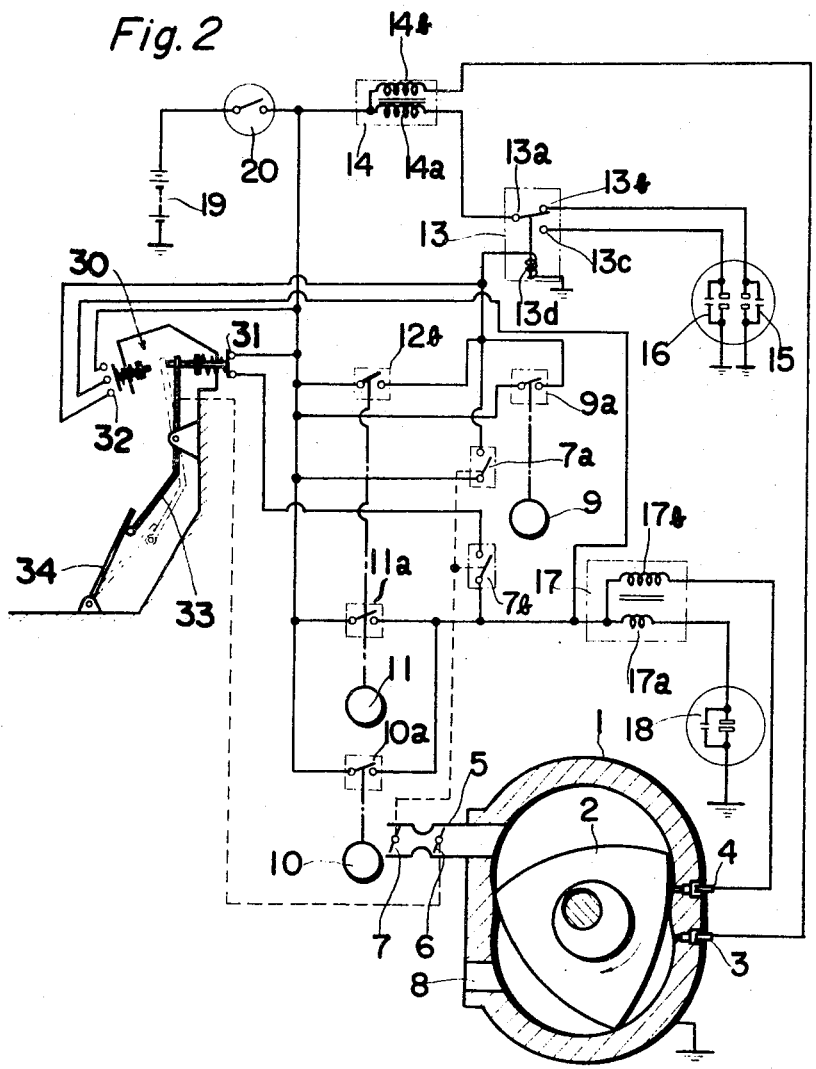

These and other objects and features of the present invention will become apparent from the following description taken in conjunction with preferred embodiments shown in the accompanying drawings, in which:

FIG. 1 is a schematic diagram showing a rotary piston internal combustion engine in side section with a wiring used to connect between spark plugs and a ignition system of the present invention, and FIG. 2 is a similar diagram to FIG. 1, but showing another preferred embodiment of the present invention.

Before the description proceeds, it is to be noted that like parts are designated by like reference numerals throughout the accompanying drawings. In addition, although the present invention will be hereinafter described by way of example in connection with the rotary piston internal cOmbustion engine having a pair of spark plugs disposed in the engine housing structure at the leading and trailing sides with respect to the direction of rotation of the rotary piston, one of said spark plugs disposed at the leading side and the other disposed at the trailing side will be hereinafter referred to as "leading spark plug" and "trailing spark plug", respectively.

Furthermore, the spark plug ignition system of the present invention in its perferred embodiments broadly includes a leading spark plug ignition circuit for igniting the leading spark plug and a trailing spark plug ignition circuit for igniting the trailing spark plug.

Referring first to FIG. 1, to rotary piston internal combustion engine comprises a housing structure having a peripheral wall 1 with an epitrochoid-shaped inner surface. This housing further comprises end walls, (not shown) within which a shaft is rotatably supported, said shaft carrying an eccentric portion. A triangle-shaped rotary piston 2 is mounted for rotation on the eccentric portion and is provided at its apexes with radially movable seal strips (not shown) which continuously sweep along the inner surface of the peripheral wall 1 as the rotary piston 2 rotates. In the arrangement, a plurality of working chambers are formed between the rotary piston 2 and the peripheral wall 1, each of which varies in volume as the rotary piston 2 undergoes each cycle of four strokes of intake, compression, power and exhaust.

The peripheral wall 1 is provided with suitably spaced intake and exhaust ports 5 and 8 and a pair of suitably spaced leading and trailing spark plugs 3 and 4 which are also spaced around said intake and exhaust ports 5 and 8. The intake port 5 is connected with an air source (not shown) through an intake passage having therein a throttle valve 6 and a choke valve 7 disposed in spaced relation with respect to each other on the both sides of a venturi portion of said intake passage, as is well known to those skilled in the art.

The structure of the rotary piston internal combustion engine so far described is well known to those skilled in the art and, therefore, the details thereof are omitted for the sake of brevity. However, it is to be noted that the leading and trailing spark plugs 3 and 4 have their own ignition timings at which they are ignited. In other words, when both spark plugs are to be ignited, one example of design is such that the leading spark plug is first switched on and then the trailing spark plug is switched on immediately after the leading spark plug has been switched on. The reason for this particular operation of the pair of spark plugs is also well known to those skilled in the art.

The present invention is mainly directed to the ignition system for operating the spark plugs 3 and 4 and reference is, therefore, made thereto in the following description.

In FIG. 1, reference numeral 20 indicates an ignition or main switch having a movable contact connected with a positive terminal of a power source 19, of which the other negative terminal is grounded, and a fixed contact associated with the leading spark plug ignition circuit and also with the trailing spark plug ignition circuit, as will be mentioned later.

The leading spark plug ignition circuit includes an ignition coil 14 having a primary winding 14a and a secondary winding 14b. The primary winding 14a has one end connected with one end of the secondary winding 14b and in turn connected with the fixed contact of the ignition switch 20 and the other end connected with ground through a relay switch 13 and a distributor of any suitable construction having a spark retard mechanism 15 and a normal spark mechanism 16. The other end of the secondary winding 14b is directly connected with the leading spark plug 3.

The trailing spark plug ignition circuit includes an ignition coil 17 having a primary winding 17a having one end associated with the fixed contact of the ignition switch 20 and the other end connected with ground through a distributor 18 of any suitable construction without the spark retard mechanism, and a secondary winding 17b having one end connected with the first mentioned end of the primary winding 17a and the other directly connected with the trailing spark plug 4.

The relay switch 13 includes a movable contact 13a, a pin of fixed contacts 13b and 13c connected with ground respectively through the spark retard mechanism 15 and the normal spark mechanism 16, and a solenoid coil 13d adapted to switch the movable contact 13a between the fixed contacts 13b and 13c. When said solenoid coil 13d is excited, the movable contact 13a is switched to the first contact 13c. plugs Parallelly disposed between the fixed contact of the ignition switch 20 and one end of the solenoid coil 13d having the other end grounded is a first switch 7a, a second or thermo switch 9a and a third or detector switch 12a.

The first switch 7a is operable in response to the positioning of the choke valve 7 in such a way as to close when the choke valve 7 is in the open position and to open when the choke valve 7 is in the substantially closed position. The second switch 9a is operatively associated with a thermo detector 9 so that, when the engine temperature detected by the thermo detector 9 exceeds over a predetermined value, for example, 40°C., the thermo detector 9 causes the second switch 9a to close and, when the engine temperature detected thereby is lower than the predetermined value, said detector maintains the second switch 9a in the open position. The third switch 12a is operable in response to the operation of the trailing spark plug ignition circuit in such a way as to close when the trailing spark plug ignition circuit is operated and to open when the trailing spark plug ignition circuit is in the inoperative position.

Also parallelly disposed between the fixed contact of the ignition switch 20 and the ignition coil 17 is a fourth or thermo switch 10a and a fifth switch 11a, the former being operatively associated with another thermo detector 10 in such a way as to cause the fourth switch 10a to close only when said detector 10 detects the engine temperature exceeding over another predetermined value, for example, 70°C., which is higher than the first mentioned predetermined value for the detector 9. The fifth switch 11a is operatively associated with an engine speed detector 11 in such a way as to cause said switch 11a to close only when the engine speed or rotation detected by the engine speed detector 11 exceeds over a predetermined value, for example, 4,000 r.p.m.

Although not shown, it is to be noted that the switching operation of the third switch 12a can be effected by the provision of means for detecting the operation of the trailing spark plug ignition circuit, such as a solenoid operated relay switch having a solenoid coil which may be inserted between a combination of the switches 11a and 10a and the ignition coil 17. Alternatively, this switch 12a may be operatively associated with the switches 10a and 11a so that, when either of said switches 10a and 11a is closed, said switch 12a is also closed.

While in the above construction, it is clear that the spark plug ignition system of the present invention can be operated as listed item to item under various combinations of the engine speed, the engine temperature, and/or the positioning of the choke valve 7.

[I] When the choke valve 7 is closed and therefore the switch 7a is opened:

1. if the engine temperature is lower than 40°C. and the engine speed is smaller than 4,000 r.p.m., the associated switches 9a, 10a and 11a are respectively opened and, therefore, only the leading spark plug 3 can be switched on with the relay switch 13 in position to connect the movable contact 13a to the contact 13b so that the ignition timing of this spark plug 3 can be retarded.

2. if the engine temperature is lower than 40°C. and the engine speed is greater than 4,000 r.p.m., the switches 9a and 10a are opened while the switch 11a is closed and, therefore both the leading and trailing spark plugs 3 and 4 can be switched on in different normal timings.

3. if the engine temperature is higher than 40°C. but lower than 70°C. and the engine speed is smaller than 4,000 r.p.m., the switch 9a is closed while the switches 10a and 11a are opened and, therefore, the leading spark plug 3 can only be switched on with the relay switch 13 in position to connect the movable contact 13a to the contact 13c so that the ignition timing of this spark plug 3 can be fixed at the normal timing.

4. if the engine temperature is higher than 40°C. but lower than 70°C. and the engine speed is greater than 4,000 r.p.m., the switches 9a and 11a are closed while the switch 10a is opened and, therefore, both the leading and trailing spark plugs 3 and 4 can be switched on in different normal timings.

5. if the engine temperature is higher than 70°C., the switches 9a and 10a are closed and, therefore, both the leading and trailing spark plugs 3 and 4 can be switched on in different normal timings irrespective of the engine speed.

[II] When the choke valve 7 is opened and therefore the switch 7a is closed:

1. if the engine temperature is lower than 40°C. and the engine speed is smaller than 4,000 r.p.m., the switches 9a, 10a and 11a are respectively opened and therefore only the leading spark plug 3 can be switched on with the relay switch 13 in position to connect the movable contact 13a to the contact 13c so that the ignition timing of this spark plug 3 can be fixed at the normal timing.

2. if the engine temperature is lower than 40°C. and the engine speed is greater than 4,000 r.p.m., the switches 9a and 10a are opened while the switch 11a is closed and, therefore both the leading and trailing spark plugs 3 and 4 can be switched on in different normal timings.

3. if the engine temperature is higher than 40°C. but lower than 70°C. and the engine speed is smaller than 4,000 r.p.m., the switch 9a is closed while the switches 10a and 11a are opened and, therefore, the leading spark plug 3 can only be switched on with the relay switch 13 in position to connect the movable contact 13a to the contact 13c so that the ignition timing of this spark plug 3 can be fixed at the normal timing.

4. if the engine temperature is higher than 40°C. but lower than 70°C. and the engine speed is greater than 4,000 r.p.m., the switches 9a and 11a are closed while the switch 10a is opened and, therefore, both the leading and trailing spark plugs 3 and 4 can be switched on in different normal timings.

5. if the engine temperature is higher than 70°C., the switches 9a and 10a are closed and, therefore both the leading and trailing spark plugs 3 and 4 can be switched on in different normal timings irrespective of the engine speed.

According to the foregoing embodiment of the present invention, particularly when the engine is initially operated with the engine temperature being of a relatively lower value while the choke valve is closed, which condition is especially apparent during the winter season and/or in a severly cold district, the ignition timing of the leading spark plug can be advantageously retarded, while the other trailing spark plug is switched off, to effect a retarded burning of the fuel-air mixture in the working chamber under power stroke so that the emission of noxious unburned compounds contained in the exhaust gas emerging from the exhaust system of the engine can be reduced or substantially eliminated.

In the following perferred embodiment of the present invention shown in FIG. 2, means for operating the spark plug ignition system of FIG. 1 in response to the load imposed on the engine is added to the embodiment shown in FIG. 1.

Referring now to FIG. 2, the ignition system operating means thus additionally provided in the embodiment of FIG. 1 comprises a first push button two point make 31 which is normally opened and inserted between the ignition switch 20 and the first switch 7a and, at the same time, inserted at the side of the ignition switch 20 between the ignition switch 20 and the ignition coil 17 through a first switch 7b, and a second push button three point make 32 which is also normally opened and inserted between the ignition switch 20 and the solenoid coil 13d of the relay switch 13 and between the ignition switch 20 and the ignition coil 17. These push button two point makes 31 and 32 are adapted to be alternately switched on and off by a common operating link 33 having one end adapted to operate these makes 31 and 32 and the other end operatively associated with an accelerator pedal 34 which is in turn operatively, as is well known to those skilled in the art, associated with the throttle valve 6. While in the above construction, unless otherwise the accelerator pedal 34 is depressed to open the throttle valve 6, the first push button two point make 31 can be maintained in the switched-on position by means of the link 33 while the second push button two point make 33 is switched off. However, the latter can be switched on only when the accelerator pedal 34 is fully depressed to bring the throttle valve 6 in the full open position. When the accelerator pedal 34 is half depressed to establish the part throttle operation, the push button two point make 31 and the push button three point make 32 can be respectively switched off. When the push button three point make 32 is switched on, three contact points of said three point make 32 can be short circuited with respect to one another and, if said three point make 32 is switched off, said three contact points can be separated from one another. The second switch 7b is operatively associated with the choke valve 7 in the same way as the switch 7a so that the switch 7b can be opened upon the substantial closure of the choke valve 7 and closed upon the opening of said choke valve 7.

In this embodiment, attention is directed to the switch 12b corresponding to the switch 12a in the foregoing embodiment is designed such as to close upon closure of the switch 11a and to open upon opening of the switch 11a.

The spark plug ignition system operating means 30 shown can operate, in such a way as to ensure the normal operation of each of the spark plugs 3 and 4 during the idling or decelerated condition (below 4,000 r.p.m.) including the engine braking, so long as the choke valve 7 is fully opened, and to ensure the normal operation of each of the spark plugs 3 and 4 during full throttle operation regardless of the operation of the choke valve 7.

Of course, even the embodiment shown in FIG. 2 can follow the modes of operation afforded by the first mentioned embodiment shown in FIG. 1. However, the operation of the embodiment shown in FIG. 2 is tabulated in Table 1.

Although the present invention has been fully described by way of example with reference to the accompanying drawings, it is to be noted that various changes and modifications are apparent to those skilled in the art. For example, to improve the cranking efficiency of the engine, the arrangement may be designed such that both the leading and trailing spark plugs 3 and 4 can be normally switched on during the cranking of the engine. Such changes and modifications are to be construed as included within the scope of the present invention unless otherwise departing therefrom.

TABLE I

|  | Engine speed lower than 4,000 r.p.m. | | | | Engine speed higher than 4,000 r.p.m. |
|---|---|---|---|---|---|
|  | Choke valve closed | | Choke valve open | | |
|  | [X] | [Y] | [A] | [B] | |
| Engine temperature— | | | | | |
| Lower than 40 °C.: | | | | | |
| Leading spark plug | Retarded | Normal | Normal | Normal | Normal |
| Trailing spark plug | Off | Normal | Normal | Off | Normal |
| Between 40 °C–70 °C.: | | | | | |
| Leading spark plug | Normal | Normal | Normal | Normal | Normal |
| Trailing spark plug | Off | Normal | Normal | Off | Normal |
| Higher than 70 °C.: | | | | | |
| Leading spark plug | Normal | Normal | Normal | Normal | Normal |
| Trailing spark plug | Normal | Normal | Normal | Normal | Normal |

[A] During the idling, the deceleration or the full-throttle operation.
[B] During the operation other than mentioned in [A].
[X] Under part-throttle to closed throttle operation.
[Y] Under full throttle operation.

What we claim is:

1. A spark plug ignition system for use in a rotary piston internal combustion engine comprising a housing structure having a peripheral wall formed with a multilobed inner peripheral surface, a multilobed rotary piston mounted for rotation within said housing structure, said housing structure being formed with an intake port connected with an air source through a choke valve and a throttle valve, an exhaust port and at least two spark plugs arranged one behind the other in the direction of rotation of said rotary piston, said ignition system comprising means for detecting the engine temperature, means for detecting the engine speed, means for detecting the positioning of the choke valve and means for controlling the ignition timing of each of said two spark plugs whereby, when the engine temperature detected by said engine temperature detecting means is lower than a predetermined value and said engine speed is also smaller than a predetermined value during the substantial closure of said choke valve, the ignition timing of one of said two spark plugs which is positioned at the leading side with respect to the piston rotational direction is retarded while the other spark plug positioned at the trailing side with respect to the piston rotational direction is switched off.

2. The ignition system as claimed in claim 1, further comprising means for detecting the low load drive of the engine by which, when the engine temperature detected by said engine temperature detecting means is lower than the predetermined value and said engine speed is also smaller than the predetermined value during the substantial closure of said choke valve and concurrently when the engine is operated under low load drive, the ignition timing of siad leading spark plug can be retarded while the other trailing spark plug is switched off.

3. An ignition system as claimed in claim 1, wherein said engine temperature detecting means includes a first detector means operable only when the engine temperature exceeds over a first predetermined value and a second detector means operable only when the engine temperature exceeds over a second predetermined value whereby, when the engine temperature detected is lower than said first predetermined value and the engine speed is also smaller than the predetermined value during the substantial closure of the choke valve, the ignition timing of the leading spark plug is retarded while the other spark plug is switched off; when said engine temperature detected is existing between said first and second predetermined values and the engine speed is also smaller than the predetermined value during the substantial closure of said choke valve, the ignition timing of the leading spark plug is fixed at the normal timing while the other trailing spark plug is switched off; and when said engine temperature is higher than the second predetermined value and the engine speed is also smaller than the predetermined value during the substantial closure of said choke valve, both the leading and trailing spark plugs are normally switched on.

4. A spark plug ignition system for use in a rotary piston internal combustion engine comprising a housing structure having a peripheral wall formed with a multilobed inner peripheral surface, a multilobed rotary piston mounted for rotation within said housing structure, said housing structure being formed with an intake port connected with an air source through a choke valve and a throttle valve, an exhaust port and at least two spark plugs arranged one behind the other in the direction of rotation of said rotary piston, siad ignition system comprising a first means for detecting the engine temperature and operable only when said engine temperature exceeds over a first predetermined value, a second means for detecting the engine temperature and operable only when said engine temperature exceeds over a second predetermined value, means for detecting the engine speed and operable only when said engine speed exceeds over a predetermined value, means for detecting the positioning of the choke valve, means for detecting the low load drive of the engine and means for controlling the ignition timing of each of said two spark plugs whereby, when the engine temperature detected is lower than said first predetermined value and the engine speed is smaller than the predetermined value during the substantial closure of the choke valve under low load drive, the ignition timing of one of said two plugs positioned at the leading side with respect to the piston rotational direction is retarded while the other spark plug positioned at the trailing side with respect to the piston rotational direction is switched off; when the engine temperature detected is existing between said first and second predetermined values and the engine speed is smaller than the predetermined value during the substantial closure of the choke valve under the low load drive, the leading spark plug is normally switched on while the other trailing spark plug is switched off; and when the engine temperature detected is higher than the second predetermined value and the engine speed is smaller than the predetermined value during the substantial closure of the choke valve under the low load drive, both the leading and trailing spark plugs is normally switched on.

* * * * *